US007434391B2

(12) United States Patent
Asam et al.

(10) Patent No.: US 7,434,391 B2
(45) Date of Patent: Oct. 14, 2008

(54) EXCAVATOR AND A MACHINE FOR MATERIAL TRANSFER

(75) Inventors: Dirk Asam, Ulm (DE); Rolf Mieger, Kirchdorf (DE); Roland Wachter, Oberroth (DE); Bernd Wager, Kirchdorf (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 103 days.

(21) Appl. No.: 11/175,753

(22) Filed: Jul. 6, 2005

(65) Prior Publication Data

US 2006/0053666 A1 Mar. 16, 2006

(30) Foreign Application Priority Data

Jul. 7, 2004 (DE) ....................... 10 2004 032 868

(51) Int. Cl.
*F16D 31/02* (2006.01)

(52) U.S. Cl. ........................................................ 60/414

(58) Field of Classification Search ................... 60/413, 60/414, 416

See application file for complete search history.

(56) References Cited

U.S. PATENT DOCUMENTS 6,918,247 B1 * 7/2005 Warner ........................ 60/414
2002/0001516 A1 * 1/2002 Cook et al. ................. 414/685

FOREIGN PATENT DOCUMENTS

| | | |
|---|---|---|
| DE | 10315071 | 11/2003 |
| DE | 10256442 | 12/2003 |
| FR | 2238811 | 2/1975 |
| JP | 60-250128 | 12/1985 |
| JP | 3-036333 | 2/1991 |
| JP | 4-120324 | 4/1992 |
| JP | 5-163745 | 6/1993 |
| JP | 09-310379 | 12/1997 |
| JP | 2004-116675 | 4/2004 |
| JP | 2004-116676 | 4/2004 |
| JP | 2004-125094 | 4/2004 |
| WO | 93/11363 | 6/1993 |
| WO | 98/33989 | 8/1998 |

* cited by examiner

*Primary Examiner*—Michael Leslie
(74) *Attorney, Agent, or Firm*—Dilworth & Barrese LLP

(57) ABSTRACT

The invention relates to an excavator or to a machine for material transfer comprising an element movable via at least one hydraulic cylinder. In accordance with the invention, one or more hydraulic cylinders are additionally hinged to the element, with the additional hydraulic cylinder(s) being connected to one or more hydraulic accumulators.

7 Claims, 2 Drawing Sheets

EXCAVATOR AND A MACHINE FOR MATERIAL TRANSFER

BACKGROUND OF THE INVENTION

The invention relates to excavators and to machines for material transfer comprising an element movable via at least one hydraulic cylinder.

With excavators and machines for material transfer such as excavators, wheel-mounted loaders and similar plant, a boom and/or a shaft are moved e.g. via two parallel hydraulic cylinder pairs. In the case of an excavator, an attachment tool is then attached to the shaft and the good to be loaded is transferred with it. Both the boom and the shaft and the attachment tools naturally have masses. This means that only a small part of the energy used for the lifting work benefits the lifting of the load. The much greater part must be used for the lifting of the equipment and of the attachment tool.

Figure 1:
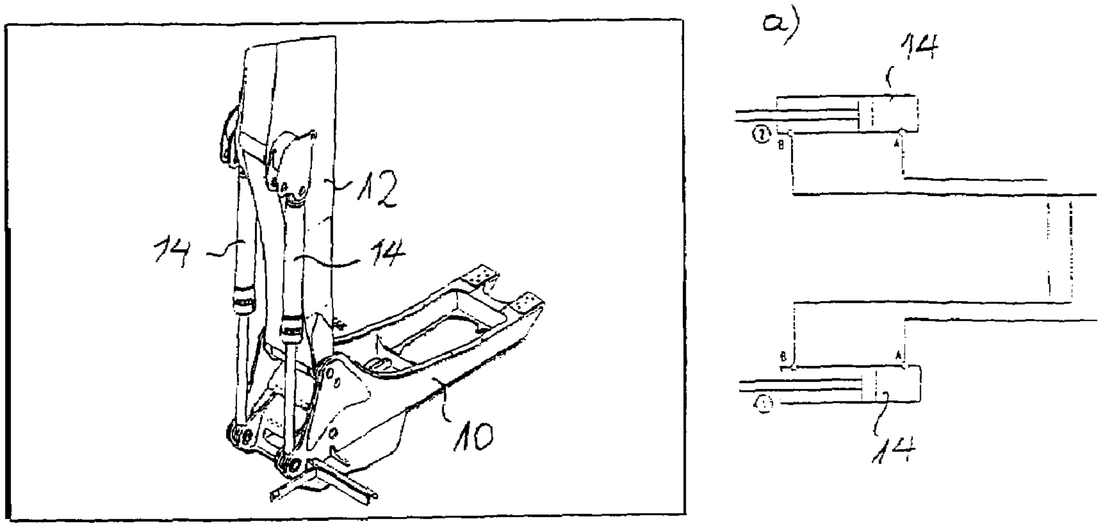
PRIOR ART Fig. 1

A detail of an excavator and of machines for material transfer in accordance with the prior art is shown by way of example in FIG. 1. It is an excavator in the present case. A boom 12 is hinged to a rotating deck 10 of an excavator here and is movable via two hydraulic cylinder pairs 14. The hydraulic cylinder pairs are connected together, as can be seen from the hydraulic circuit diagram in accordance with FIG. 1*a*.

Some first efforts have already been made to recover the energy expended in the lifting work of the equipment and of the attachment tool in an energy recovering system. For this purpose, it was attempted, for example in DE 102 56 442 A1 and DE 103 15 071 A1, to feed hydraulically stored energy into the main hydraulic circuit. However, this is only successful with limitations since the infeed pressure must always be larger than the system pressure in the main circuit.

SUMMARY OF THE INVENTION

It is therefore the object of the present invention to provide an excavator or a machine for material transfer in accordance with the element movable via at least one hydraulic cylinder in which a large part of the energy expended for the lifting of the equipment and attachment tool can, where possible, be stored for successive work cycles.

This object is solved in accordance with the invention in that, in addition to the at least one hydraulic cylinder present for the movement of the movable elements, one or more additional hydraulic cylinders are hinged to the element to be moved, with the additional cylinder(s) being connected to one or more hydraulic accumulators of their own. These additional hydraulic cylinders can be arranged parallel to the already present at least one hydraulic cylinder, but can also be attached at a different position. In accordance with the invention, the additional hydraulic cylinders do not engage in the hydraulic system, but are connected on the piston side with a hydraulic accumulator which can consist of a piston accumulator or a bladder accumulator.

Advantageous aspects of the present invention result from the description herein.

The element to be moved can accordingly be a boom or a shaft of the excavator or of the machine for material transfer.

The additional hydraulic cylinder(s) can be arranged between two hydraulic cylinders which serve to move the element, i.e. the boom or the shaft.

In accordance with the invention, the accumulator is loaded on the downward movement of the equipment. The stored energy then in turn supports the upward movement of the equipment. The equipment weight can hereby be compensated at least partly. The same work is carried out via the, for example, three cylinders now present instead of the two previously present as was previously carried out by the two hydraulic cylinders connected in the hydraulic circuit.

In accordance with a particularly advantageous embodiment of the invention, the additional hydraulic cylinder(s) can be connectable to the main hydraulic circuit of the excavator or machine for material transfer via a switchable valve. For example, for the case that the storage system breaks down, the third cylinder can thus be switched into the main hydraulic circuit via a valve so that the machine is not down and can carry out its work without a problem.

Furthermore, with a multi-element equipment and on the provision of more than one additional hydraulic cylinder, the number of additional hydraulic cylinders can advantageously be connected among one another. For example, on the downward movement of the boom, the additional hydraulic cylinder of the shaft can thus be fed such that the shaft is supported on extension and vice versa.

The solution of the initially presented object in accordance with the invention results in a series of advantages: The previously used main hydraulic cylinders can thus be dimensioned smaller. Less energy from the diesel engine is necessary overall for the lifting. Higher working speeds are possible. The engine can theoretically have less power or, if it has a higher power, it can work in the part load range. Less energy has to be removed via the radiator overall. The machine efficiency can be considerably increased. The fuel consumption can thus be lowered. This in turn results in a lowering of operating costs.

Moreover, the bearing strains of the hydraulic cylinders can also be distributed onto six bearing positions instead of the usual four. Due to the provision of accumulator(s) of its/their own for the additional hydraulic cylinder(s), an active feeding into the main hydraulic circuit is not necessary. No complex hydraulic connections are thereby necessary.

The processes of feeding energy into the additional hydraulic cylinder(s) are possible at any pressure level. No consideration has to be made of the pressure level of the main hydraulic circuit here. Finally, system redundancy is given by switching the additional hydraulic cylinder(s) over to the main hydraulic circuit.

BRIEF DESRIPTION OF THE DRAWINGS

Figure 2:
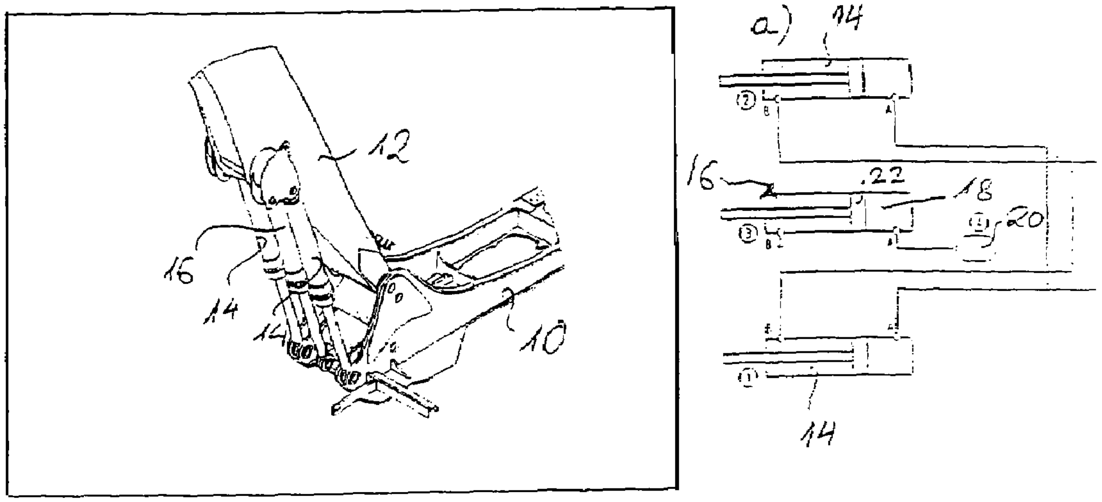
Figure 3:
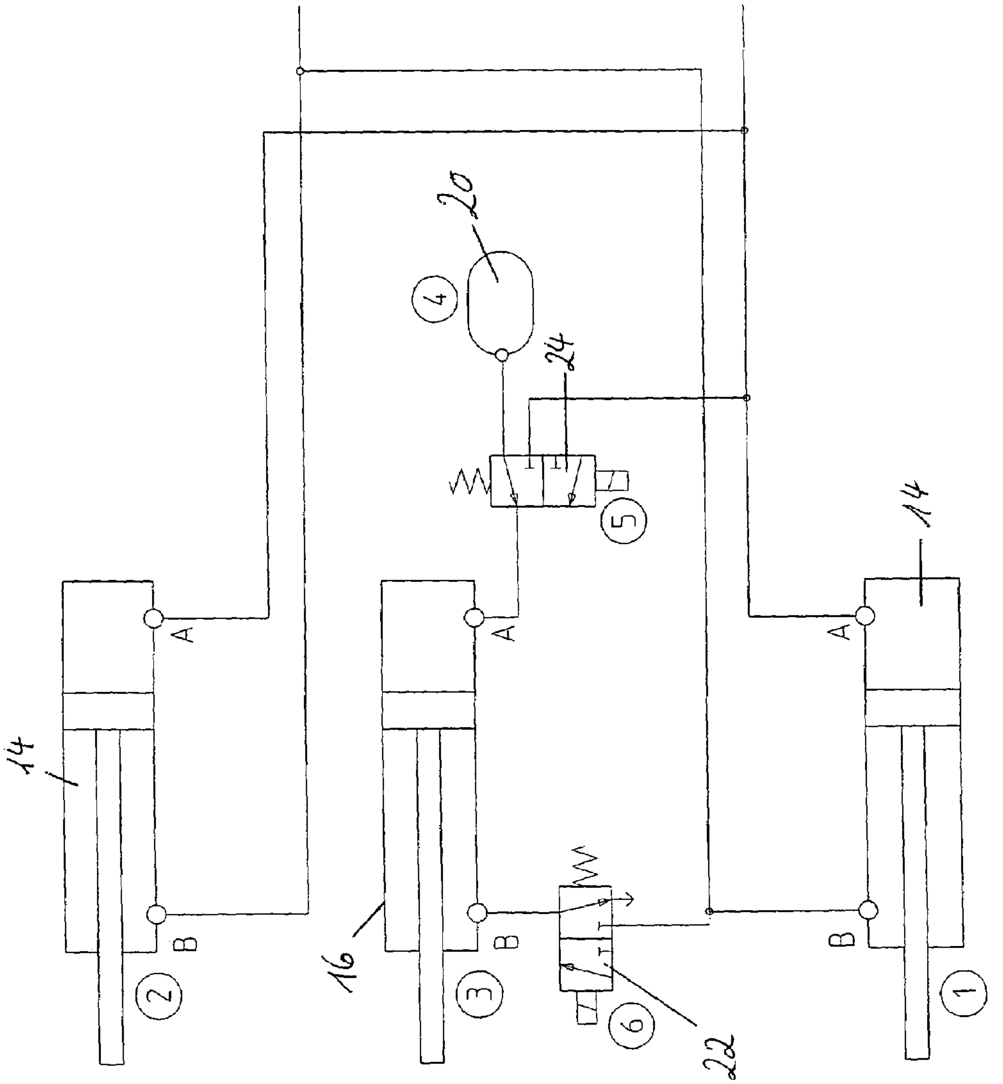

Further features, details and advantages of the invention result from the embodiments shown in the drawing. There are shown:

FIG. 1: a detail view of a part of an excavator or of a machine for material transfer in accordance with the prior art;

FIG. 2: a representation in accordance with FIG. 1 in accordance with an embodiment variant of the present invention (including the hydraulic circuit diagram); and FIG. 3: a schematic hydraulic circuit diagram of a variant of the embodiment in accordance with FIG. 2.

DESCRIPTION OF THE PREFERRED EMBODIMENTS

A detail of a hydraulic excavator is shown with reference to FIG. 2 by way of example for an excavator and machines for material transfer. Here, a boom 12 is pivotably hinged to a rotating deck 10, with the pivoting up and down of the boom 12 taking place via hydraulic cylinders 14. In addition to the hydraulic cylinders 14, an additional hydraulic cylinder 16 is arranged centrally. It can be seen from the hydraulic circuit diagram in accordance with FIG. 2*a* that the hydraulic cylinders 14 are connected to one another in a similar manner to that already known from the prior art (cf. FIG. 1*a*). In addition to the hydraulic cylinders 14, an additional hydraulic cylinder 16 is provided whose piston side 18 is connected to a hydraulic accumulator 20 which can, for example, be a piston accumulator or a bladder accumulator.

As can be seen from the hydraulic circuit in accordance with FIG. 2*a*, the additional hydraulic cylinder 16 is independent of the hydraulic cylinders 14. The hydraulic. cylinder 16 serves the purpose of the hydraulic fluid being displaced in the direction toward the hydraulic accumulator 20 by the piston 22 on a downward movement of the equipment. The energy is stored here until the boom 12 should again be moved upwardly. Here, the energy stored in the accumulator 20 is released again by means of the additional hydraulic cylinder 16 so that a large part of the mass force of the boom and of the shaft or equipment suspended thereon is compensated and no longer has to be expended by the hydraulic cylinders 14.

In the hydraulic circuit diagram in accordance with FIG. 3, there is a basically similar embodiment variant as in the hydraulic circuit diagram in accordance with the embodiment variant of FIG. 2*a*. Here, however, a selective connection with the main hydraulic circuit, via which the hydraulic cylinders 14 are supplied, is possible via corresponding switch valves 22 and 24 for the additional hydraulic cylinder 16, which is here likewise connected to a hydraulic accumulator 20. The additional hydraulic cylinder 16 can therefore be connected into the main hydraulic circuit depending on the position of the valves 22 and 24. This may, for example, be desired when the accumulator 20 is defective and when the hydraulic excavator should continue to work continuously despite this defect until it can be repaired.

The invention claimed is:

1. An excavator or a machine for material transfer, comprising an element coupled to a member to be movable with respect to the member, at least one hydraulic cylinder coupled to the element and member to move the element with respect to the member, at least one hydraulic cylinder additionally hinged to the element and member to move the element with respect to the member in the same direction, and one or more hydraulic accumulators connected to the additional hydraulic cylinder, wherein the additional hydraulic cylinder(s) is/are connectable to a main hydraulic circuit of the excavator or machine for material transfer via a switchable valve.

2. An excavator or a machine for material transfer in accordance with claim 1, wherein the element is a boom or shaft of the excavator or a machine for material transfer.

3. An excavator or a machine for material transfer in accordance with claim 1, wherein the additional hydraulic cylinder (s) is/are arranged between or outside the one or more hydraulic cylinders coupled to the element and member.

4. An excavator or a machine for material transfer in accordance with claim 2, wherein the additional hydraulic cylinder (s) is/are arranged between or outside the one or more hydraulic cylinders coupled to the element and member.

5. An excavator or machine for material transfer in accordance with claim 1, wherein both said cylinders are arranged to pivot the element with respect to the member.

6. An excavator or machine for material transfer in accordance with claim 5, comprising three hydraulic cylinders coupled to the element and member, with said at least one additional hydraulic cylinder additionally hinged to the element and member situated between two hydraulic cylinders.

7. An excavator or machine for material transfer in accordance with claim 1, comprising three hydraulic cylinders coupled to the element and member, with said at least one additional hydraulic cylinder additionally hinged to the element and member situated between two hydraulic cylinders.

* * * * *